United States Patent [19]

Sussell et al.

[11] Patent Number: 5,528,676
[45] Date of Patent: Jun. 18, 1996

[54] MISSED CALLS ACCOUNTING AND REPORTING SYSTEM

[76] Inventors: Michael A. Sussell, 321 Greenwich St.;
Daniel D. Feinsmith, 10 Hubert St. #4,
both of New York, N.Y. 10013

[21] Appl. No.: 298,223

[22] Filed: Aug. 29, 1994

[51] Int. Cl.⁶ .................................................. H04M 15/00
[52] U.S. Cl. ........................ 379/111; 379/112; 379/113;
379/133; 379/134; 379/139
[58] Field of Search ............................ 379/34, 111, 112,
379/113, 121, 130, 131, 132, 133, 140,
157, 139

[56] References Cited

U.S. PATENT DOCUMENTS

| | | | |
|---|---|---|---|
| 3,829,618 | 8/1974 | Brandon | 379/133 |
| 4,270,024 | 5/1981 | Theis et al. | 379/34 |
| 4,319,090 | 3/1982 | Garwood et al. | 179/8 |
| 4,559,416 | 12/1985 | Theis et al. | 179/7.1 R |
| 4,656,657 | 4/1987 | Hunsicker | 379/140 |
| 5,103,475 | 4/1992 | Shuen | 379/115 |
| 5,218,632 | 6/1993 | Cool | 379/126 |
| 5,233,642 | 8/1993 | Renton | 379/59 |
| 5,241,580 | 8/1993 | Babson, III | 379/15 |
| 5,291,547 | 3/1994 | Boatwright et al. | 379/113 |

OTHER PUBLICATIONS

Nombela, "Automatic Traffic Data Aquisition Network" 1980, Tables 1 & 2.

*Primary Examiner*—Stephen Chin
*Assistant Examiner*—Paul Loomis
*Attorney, Agent, or Firm*—Goldstein & Associates

[57] ABSTRACT

A method is disclosed for monitoring the activity of a subscriber line to determine the adequacy of the current service and service options. Central to the method is determining the number of missed calls and attempted calls to the line in a given time period. A missed call is defined as a call which is not received due to the line being busy or unattended. The method comprises the steps of: monitoring the subscriber line for activity; determining the number of attempted calls to the line in a period of time; determining the number of missed calls to the line in the period of time; and generating a missed calls percentage which can be presented to the subscriber to show the inadequacy of the current level of subscriber service.

7 Claims, 3 Drawing Sheets

5,528,676

MISSED CALLS ACCOUNTING AND REPORTING SYSTEM

BACKGROUND OF THE INVENTION

1. Field of the Invention

The invention relates to monitoring, recording and analyzing telephone subscriber line activity, and more particularly, to determining the adequacy of the current level of subscriber service and service options.

2. Background

The telephone industry is constantly developing new service options in an attempt to improve the service provided to its customers and subscribers. The variety of subscriber service options available is considerable.

In most cases, a subscriber is provided telephone service by a local service provider. The most basic and economical service offered by the service provider is a single subscriber line. A single subscriber line can only support a single user at any one time. Thus, if someone is using the line, and an individual attempts to call the line, the caller will receive a busy signal. This results in a missed call. For a business entity, this may result in a lost customer or sale.

Since the entire purpose of a telephone system is to allow communication of one sort or another, service providers and telephone equipment manufacturers have devised a number of systems, with a variety of service options, that help to reduce the number of missed calls.

The oldest way of reducing the number of missed calls is to install multiple subscriber lines for a given phone number. When a first subscriber line is busy with a first call, a second incoming call to the phone number is routed to a second subscriber line. However, a missed call is still possible in a two-line phone installation if a third incoming call is attempted. Therefore, the solution would be to add still more phone lines to reduce the possibility of a missed call. This practice rapidly becomes uneconomical.

Today a common custom subscriber service is 'call waiting'. This feature is implemented at the local switch. This service option allows a customer to place an active call on hold, answer an incoming call and conduct a conversation with another party, and then resume the first conversation with the original party. As a result of installing this service option, the number of missed calls can be reduced to some degree. However, if several calls are placed to an active, off-hook subscriber line at the approximately the same time, call waiting will not prevent the occurrence of missed calls. In addition, call waiting is of no help when the subscriber line is unattended.

Another common service option, which is again offered by service providers and supported on typical exchange/switch systems, is 'voice mail'. A voice mail system provides a caller the option of leaving a message if the subscriber cannot or does not answer the line at the time the call is placed. As a result, the call can be 'received' and a response such as a return call can be made to the caller. Thus, a missed call is avoided.

The above mentioned service options are among the most popular offered by service providers. There are others, such as "call forwarding" and "transfer on busy". New service options are continually being devised, implemented, and offered to subscribers. For an additional fee, they provide enhanced service capability and will very often reduce the number of missed calls. Reducing the number of missed calls is a critical consideration for companies, large and small, who rely on their telephone service to conduct business with their customers.

It is important to note, however, that a key problem has not been addressed in the industry. How does a subscriber know when the current level of service being purchased is inadequate?. Also, how does a customer determine if the fee charged for the service option is justified by its benefit? From the service provider's standpoint, this is a marketing question. That is, if a system or method can be implemented to statistically demonstrate the inadequacy of the current service, it would allow the service provider to clearly justify to the subscriber the need for additional service options and/or lines. This would lead to the generation additional revenue for the service provider, and most likely for the subscriber as well. In particular, an approach which does not require expensive additional hardware is most desirable.

Services such as call waiting, voice mail, call forwarding, and others, are implemented within the telephone switching system itself. A switching system gets its functional capabilities from a software package generically called a switching system program. It is a large, real-time, long-lived, and frequently modified multi-module program. Indeed, these programs are so complex that they are modified under the control of other very large and complicated programs called version control software. As an example, AT&T has a version control program, which is called Extended Change Management System, or ECMS, that tracks all changes made to the switching system program. This tracking program is used so that any change to the switch program that does not work or introduces problems can be backed out of to a previous version. This particular tracking system can track and save the change history for multiple versions, concurrently. The switching system programs are generally run under a real-time, multi-tasking, and multi-user operating system. The Unix Operating System is the current industry standard for telephone switching systems.

A typical AT&T switch installation uses a 4ESS or 5ESS switching system. These switching systems currently utilize the System V version of Unix as their operating system. They are specifically designed with the intent of adding features and capabilities not yet envisioned or available at the time they are brought on-line. This is evidenced by the inclusion of the ECMS version control software development tools in the overall system package.

This kind of switch architecture is flexible, configurable and expandable. These characteristics are particularly important for telephone exchange equipment. It is these characteristics which allow features and service options to be added and/or modified. They also allow the service options to be tailored to the individual subscriber.

There are numerous examples of systems that monitor line activity in the prior art. While these units may be suitable for the particular purpose employed, or for general use, they would not be as suitable for the purposes of the present invention as hereinafter described.

U.S. Pat. No. 4,559,416 to Thesis et al, and U.S. Pat. No. 5,233,642 to Renton provide hardware separate from the service provider switch to monitor the line activity. They are either directly connected to the subscriber line, or coupled to the line with an adapter.

The Thesis patent is a portable microprocessor based system that is used to collect information and provide a profile of caller activity. The information collected is concerned with the calling party, not the called party, and does not determine information related to missed calls. Therefore this system is not at all useful in evaluating the adequacy of the current level of callee (called party) subscriber service.

The Renton patent provides another type of portable system which generates and collects call detail record information relating to the use of mobile cellular telephones. Subsequently, the collected information can be downloaded to a computer. The purpose of the system is to generate and collect call detail information that would allow records to be generated to indicate the usage of the cellular system. This includes the length of calls for outgoing and incoming calls, and the number dialed for outgoing calls. This system is not intended to, nor is it capable of, determining the number of missed calls and the adequacy of a subscriber's service.

The Renton system is one of a variety of systems known in the prior art which are concerned with call detail information, primarily for generating a calling history or billing data. These systems are not intended for the same purpose as the present invention. They require hardware not associated with a service providers switch and they are used with a particular line, or group of lines. These inventions are not at all concerned with the determination of the adequacy of a subscribers current service.

Yet another example of prior art which is concerned with call detail information is U.S. Pat. No. 5,218,632 to Cool. This system is realized using the service provider's exchange equipment, but is concerned with the details of "when" a subscriber should be billed for a call.

One final example in the prior art, U.S. Pat. No. 4,319,090 to Garwood et al, which is concerned with determining the existing service capabilities, focuses not on a subscriber's line, but instead on the exchange equipment itself. That is, the disclosure focuses on determining the capacity and capabilities of the switching system, and not that of the subscriber lines.

As stated above, what is lacking in the prior art is a system to determine when additional service is needed by subscribers by developing statistics related to missed calls for an individual subscriber. This would provide a good assessment of the current level of service, and how well that level meets the subscriber's needs.

SUMMARY OF THE INVENTION

In accordance with the invention, a system is provided which monitors the activity on a subscriber line, so that the current level of service can be analyzed to determine its adequacy. Two fundamental types of data must be collected. These are the number of "attempted calls", and the number of "missed calls" to a subscriber line, or set of subscriber lines, for a unit of time. The data collected can then be used to determine statistical data.

According to one aspect of the invention, the total number of missed calls, due to either a busy line or an unattended line, are determined. The statistical data, such as the percentage of missed calls, is then calculated based on the overall number of missed calls. The data may be collected based on time units so that missed calls can be determined corresponding to particular time periods. This would indicate particular time periods, or particular times of the day, when the current level of service is inadequate. For example, if the units of time chosen are hours, a profile of the percentage of missed calls can be determined for each hour of the day.

Another aspect of the invention is to further divide the missed calls into two categories. These are: missed calls due to an off-hook condition such as when the line is busy, and missed calls due to a lack of response which occurs when the line is unattended. This can lead to statistical analysis based on the type of missed call: busy missed calls and unattended missed calls.

Yet another aspect of the invention is to present the data and statistical results to subscribers as proof of inadequate current service. This can be done for the overall statistical data, or statistical data based on a particular type of missed call. Thus, if the percentage of missed calls as presented to the subscriber is considered significant, additional service options or subscriber lines might be requested by the subscriber.

A still further aspect of the invention is to add a service option to the subscriber line, and then monitoring the subscriber line for missed calls and attempted calls. Statistical data can be derived and compared with statistical data collected before the service option was added. The relative value of the service option may be determined by comparison of the before installation and after installation missed calls statistics.

By a still further object, several subscriber lines associated with a single phone number is monitored to determine the adequacy of the current quantity of phone lines.

BRIEF DESCRIPTION OF THE DRAWINGS

In the drawings, like elements are depicted by like reference numerals. The drawings are briefly described below.

DETAILED DESCRIPTION OF THE PREFERRED EMBODIMENT

Figure 1:
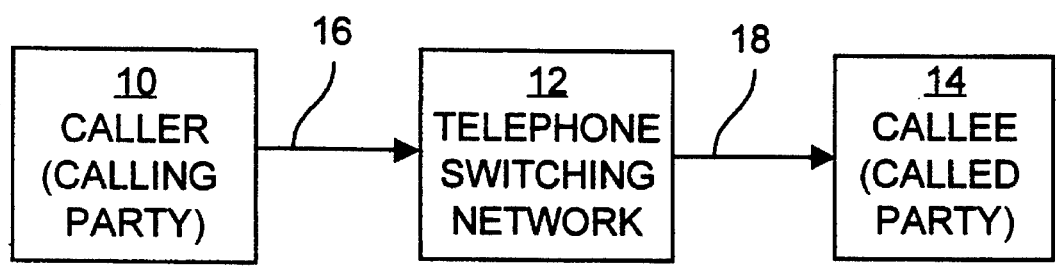
FIG. 1 is a block diagram of a telephone system according to the system of the present invention.

Referring now to FIG. 1, presented is a block diagram of a generic telephone system. This is a high level diagram, concerned with a generalized overall system structure. The caller 10 has access to the telephone switching network 12 via a caller telephone line 16. The caller 10 initiates a call by taking the caller telephone line 16 off-hook. The telephone switching network 12 provides a dial tone to the caller 10, and the caller 10 enters a callee telephone number that corresponds to the callee 14. The callee 14 is connected to the telephone switching network 12 with one or more subscriber lines 18. The telephone switching network 12 has associated with it computing facilities, which may be local to the callee 14, remote, or some combination of local and remote.

One function of the computing facilities according to the present invention is to determine and record the number of attempted calls and the number of missed calls, during a unit time. The number of missed calls and attempted calls is then used to prepare a summary of the data collected and calculate statistical data associated with the callee/subscriber service. This statistical data is presented to the callee as a measure of the overall adequacy of their current telephone installation and selection of service options.

The statistical data may comprise a missed calls percentage, which is the fraction that the missed calls is of the attempted calls. A high missed calls percentage would demonstrate to a subscriber that it would be economical to install a custom service option in an attempt to reduce the missed calls percentage.

By varying the unit time, the missed calls and attempted calls data can be categorized within time slots. These time slots might be for morning, afternoon, evening and night, or could be hourly. Thus, time specific missed calls percentages may be produced. These time specific missed call percentages might be presented to a subscriber to indicate, for example, that the subscriber is missing an inordinate number of calls in the afternoon. The time slots might also be separated for weekends and weekdays, to demonstrate to the subscriber for example that they miss a high percentage of calls during weekdays.

Upon learning of that their missed calls percentage is high, a subscriber would likely install a custom service option or service enhancement.

The custom service option selected might be call waiting, voice messaging, call forwarding, or simply an additional subscriber line 18.

Advantageously, after the installation of the custom service option, the missed calls and attempted calls to the callee are monitored. A modified missed calls percentage is determined from the missed and attempted calls subsequent to the installation of the custom service option to evaluate the adequacy of the modified telephone installation and selection of service options. The modified missed calls percentage may be compared with the missed calls percentage to determine the value of the newly installed custom service option in preventing missed calls.

The foregoing analysis may be conducted in a situation where a callee 14 has a plurality of subscriber lines 18 and wishes to determine the most economical quantity of lines to assign to the callee phone number. The missed calls percentage can be evaluated iteratively for a variety of different installations. For each installation, the missed calls percentage is noted. With each enhancement or additional line installed, the missed calls percentage should decrease. Additional lines may be added until the missed calls percentage is acceptable to the subscriber. However, to achieve an economically efficient result, at each enhancement the marginal decrease in the missed calls percentage may be compared with the marginal cost of the enhanced service. When the marginal utility for an additional service option is less than the marginal cost of the service option, the current installation is the most economical.

Figure 2:
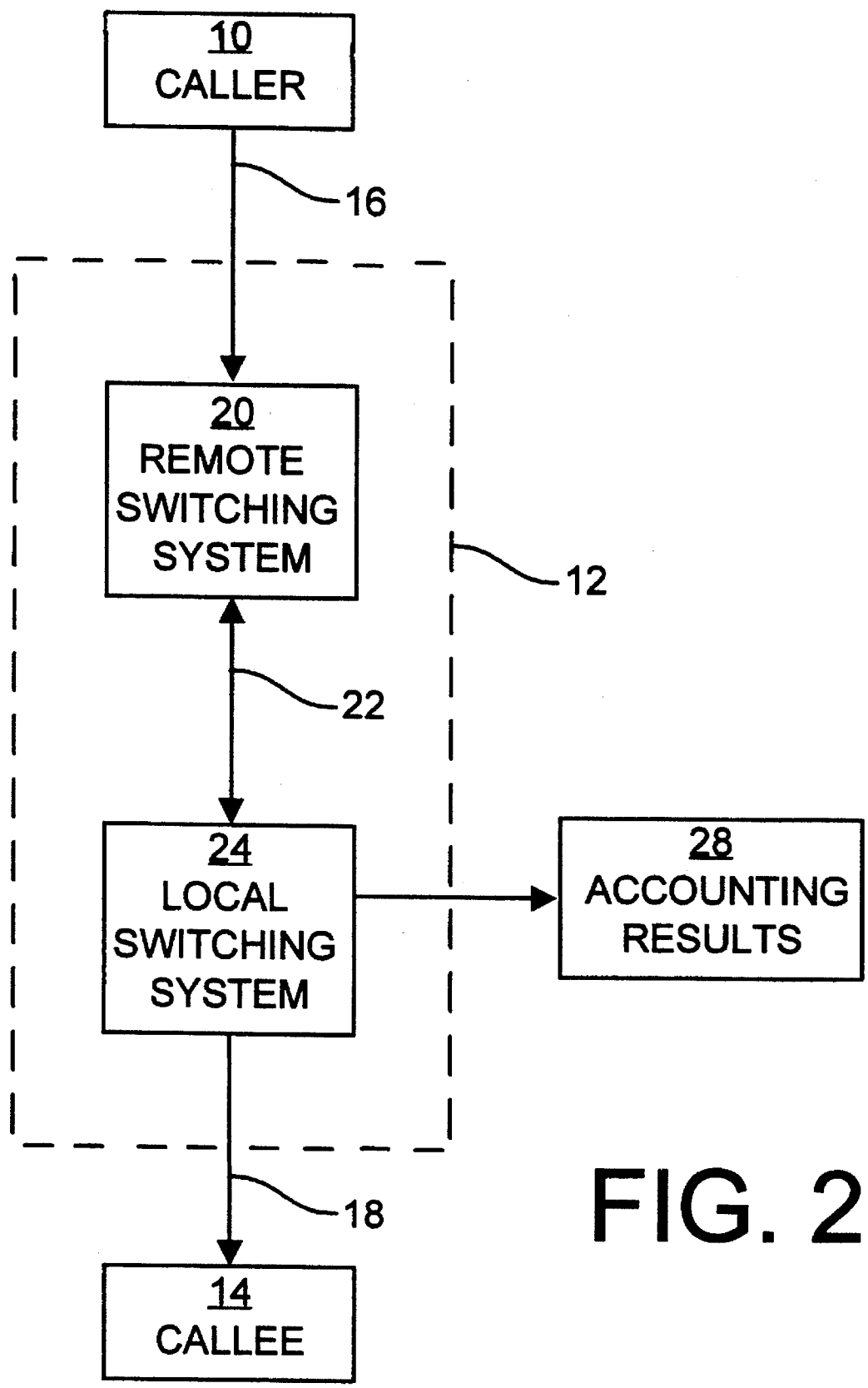
FIG. 2 is an example of a telephone system architecture with which the invention can be utilized.

Referring now to FIG. 2, provided is an example of a service provider system architecture that would support the invention. As in FIG. 1, the caller 10 initiates a call to a callee 14 via the telephone switching system 12. The call is initially routed from a remote switch 20 to a local switch 24. The call is directed from the local switch 24 to the callee 14 via the subscriber line 18. It is the local switch 24 which will monitor the subscriber line 18 for the callee 14 and determine when a call is attempted to the callee 14 and if that attempt results in a missed call.

As stated above, the particular architecture for the system can vary significantly from one switching system to another. FIG. 2 is one of many possible system architectures which will support the invention.

Figure 3:
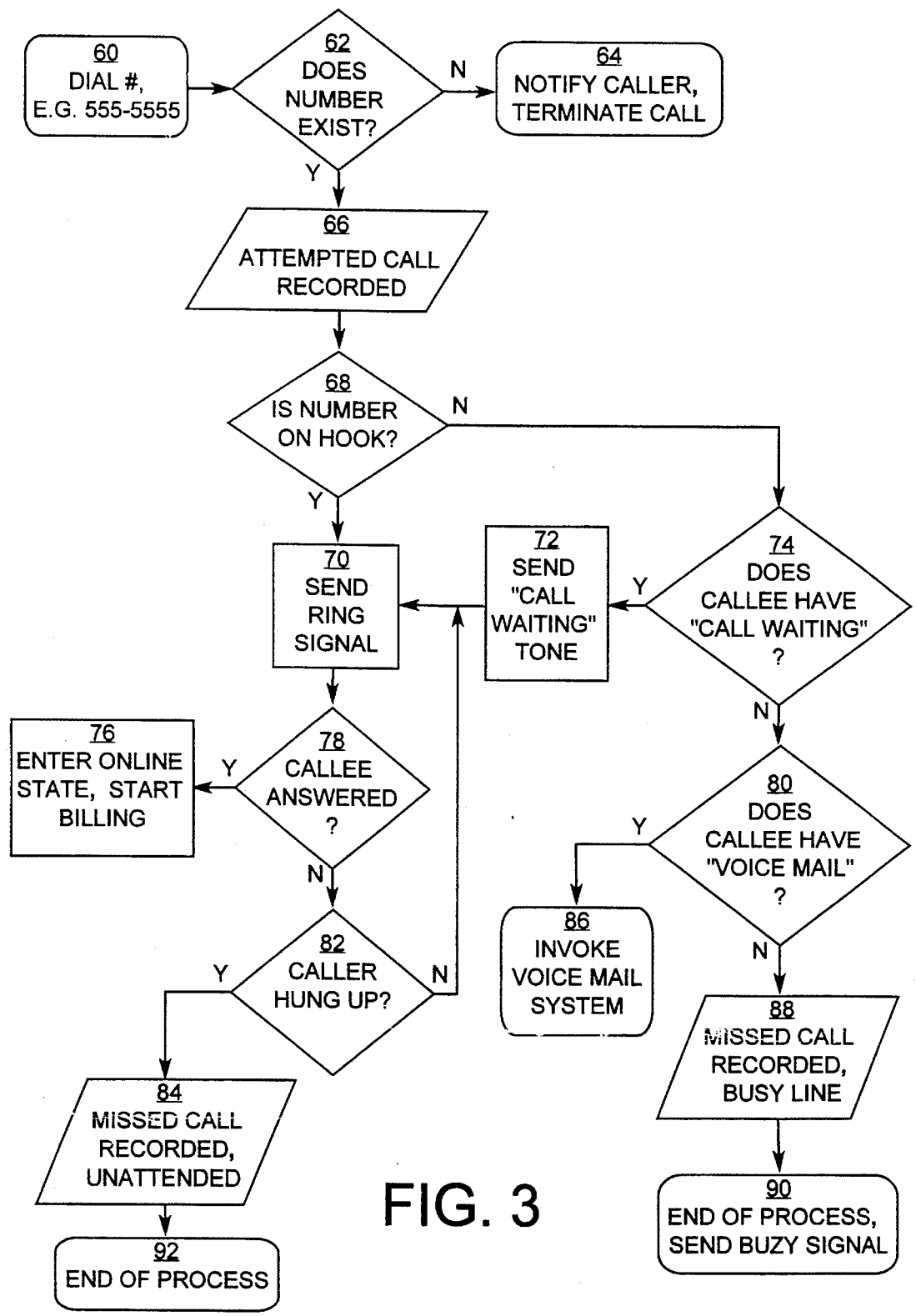
FIG. 3 presents a flow chart of an embodiment of the invention.

Referring now to FIG. 3, presented is a flow chart illustrating an embodiment of the invention for collecting data concerning missed calls and attempted calls. This system is implemented in software at the local switch 24 and represents a section of program code or module of the overall software the switching system is running. The execution of the steps shown in the flow chart will result in the determination of the number of attempted calls and the number of missed calls. This information is then analyzed to determine the missed calls percentage, as discussed previously.

The process begins with a caller dialing a telephone number 60. The number is checked to determine if it exists 62. If the number does not exist, the caller is notified and the call is terminated 64. No accounting is required. If the subscriber line is on-hook, a main ringing loop is entered.

If the number does exist, an attempted call to the callee is recorded 66. Next, a check is made to determine if the subscriber line 18 is on-hook. If the subscriber line is instead off-hook, several other checks are made to determine if the callee 14 has service enhancements that would avoid a missed call. For example, a check is made to determine if the callee has call waiting 74. If the callee does not have call waiting, a check is made to ascertain if the callee has voice mail 80. If the callee has voice mail, the voice mail system is invoked 86. If the callee does not have voice mail or any other custom service option or service enhancement that would avoid a missed call, the occurrence of a busy missed call is recorded 88. A busy signal is sent to the caller 10, terminating the process 90. In summary, the path that leads to the busy missed call, is as follows:

the callee's line was off-hook;

no call waiting service was present;

no voice mail system was available;

no other service enhancement or custom service option is installed;

a busy missed call is recorded.

When the determination is made of whether the callee has call waiting 74, if the callee does have call waiting a signal is sent to the callee 72, who is conducting an active call, to indicate that a second party is calling. The process now enters the main ringing loop. The main ringing loop comprises repeatedly sending a ring signal 70, determining whether the callee has answered 78, and detecting whether the caller has hung up 82. The main ringing loop is repeated until either the callee has answered 78, the caller has hung up 82, or if the system times-out after a given number of rings.

If the callee has answered 78, the on-line state is entered, connecting the caller 10 with the callee 14, and billing is initiated 76. However, if the caller has hung up 82 during the main ringing loop, an unattended missed call is recorded 84, which terminates the process 92 until another call to the callee is attempted. This particular missed call would result from an unattended subscriber line 18, with the caller 10 eventually terminating the attempt to reach the callee 14. In summary, the path through the flow chart that lead to this type of missed call, is as follows:

the callee's line was off-hook and a call waiting option is available, or the line was on-hook;

the callee did not answer;

the caller hung-up;

the unattended missed call is recorded.

The missed calls percentage may further comprise a busy missed calls percentage and an unattended missed calls percentage. The busy missed calls percentage is calculated to be the percentage the busy missed calls is of the attempted calls. The unattended missed calls percentage is calculated to be the percentage the unattended missed calls is of the attempted calls. The busy missed calls percentage and the unattended missed calls percentage may be presented separately to the subscriber, to demonstrate which situation is causing missed calls: a busy line or an unattended line. Accordingly, separate remedies may be selected by the subscriber. For a high unattended missed calls percentage, voice mail or call forwarding is in order. For a high busy missed calls percentage, call waiting, additional subscriber lines, or transfer on busy should be selected.

With regard to FIG. 3, it is important to note that the steps followed are illustrative only of those steps that may be followed to detect missed calls and attempted calls. That is, the structure of the process and the actual service options and enhancements tested for or which come into play in the results can vary considerably. However, the recording of missed calls and attempted calls for a callee is the overall goal of any of these alternate processes. As an example of some of the possible variations, the checks made for call waiting 78 and voice mail 80, could be extended to other services, such as call forwarding. If this were the case, a failure to reach the callee, would still result in missed calls. In the case of call forwarding, the missed call should be recorded with respect to the original number called, and also attributed to the forwarded number. Also, in FIG. 3, no path is indicated for the situation where a voice mail system is available, and the callee is on-hook. If voice mail is available, after a predetermined number of rings, the main ringing loop is exited and voice mail is invoked.

Furthermore, it is clearly possible to create a process where the accounting tasks are located in other positions in the process. For example, the attempted call recording 66, could be moved and placed between block 78 and block 76. Thus, before the billing is initiated 76, the accounting task could note an attempted call. In this case, block 84 and block 88 would be used to record an attempted call as well as a missed call.

Thus, it is to be understood that the above description is one of many possible embodiments related to the invention. The breakup of the telephone system into many smaller independent companies and the prevalence of private switching networks has resulted in large number a service providers and varied structures used to support their subscribers.

It is important to note that the invention embodied in the form illustrated in the accompanying drawings and described in the foregoing text is illustrative only. Variations are contemplated as being a part of the present invention, limited only by the scope of the claims.

What is claimed is:

1. A method for determining the adequacy of the current service and service options of a subscriber line, the method comprising the steps of:

a) monitoring the activity of a subscriber line;

b) determining the number of attempted calls to the subscriber line in a unit time;

c) determining the number of missed calls to the subscriber line in the unit time; and d) performing statistical computations with the number of attempted calls to the subscriber line, determined in step b, and the number of missed calls to the subscriber line, determined in step c, wherein the statistical calculation is a missed calls percentage which is the percentage the missed calls is of the attempted calls, and wherein the percentage of missed calls is further processed and categorized into a plurality of daily time slots.

2. A method for determining the adequacy of the current service and service options of a subscriber line, the method comprising the steps of:

a) monitoring the activity of a subscriber line;

b) determining the number of attempted calls to the subscriber line in a unit time;

c) determining the number of missed calls to the subscriber line in the unit time; and d) performing statistical computations with the number of attempted calls to the subscriber life, determined in step b, and the number of missed calls to the subscriber line, determined in step c, wherein the statistical calculation is a missed calls percentage which is the percentage the missed calls is of the attempted calls, and wherein the missed calls percentage further comprises a busy missed calls percentage and an unattended missed calls percentage.

3. A method for determining the adequacy of the current service and selection of service options of a subscriber line, the method comprising the steps of:

a) monitoring the activity of a subscriber line;

b) determining the number of attempted calls to the subscriber line in a unit time;

c) determining the number of missed calls to the subscriber line in the unit time;

d) performing statistical computations with the number of attempted calls to the subscriber line, determined in step b, and the number of missed calls to the subscriber line, determined in step c, wherein the statistical calculation is a missed calls percentage which is the percentage the missed calls is of the attempted calls;

e) installing a custom service option; and f) repeating recited steps a through d to determine a modified missed calls percentage.

4. A method for determining the adequacy of the current service and service options of a subscriber line, the method comprising the steps of:

a) monitoring the activity of a subscriber line;

b) determining the number of attempted calls to the subscriber line in a unit time;

c) determining the number of missed calls to the subscriber line in the unit time;

d) performing statistical computations with the number of attempted calls to the subscriber line, determined in step b, and the number of missed calls to the subscriber line, determined in step c, wherein the statistical calculation is a missed calls percentage which is the percentage the missed calls is of the attempted calls, and wherein the subscriber line is associated with a callee telephone number, and the missed calls percentage is determined and a subscriber line is added for the callee telephone number repeatedly until the missed calls percentage is acceptable.

5. A method for determining the adequacy of the current service and service options of a subscriber line, the method comprising the steps of:

a) monitoring the activity of a subscriber line;

b) determining the number of attempted calls to the subscriber line in a unit time;

c) determining the number of missed calls to the subscriber line in the unit time;

d) performing statistical computations with the number of attempted calls to the subscriber line, determined in step b, and the number of missed calls to the subscriber line, determined in step c, and wherein the step of determining the number of missed calls further comprises a step selected from the group consisting of:

determining that the subscriber line is off-hook, and the subscriber line does not have a voice mail capability and does not have a call waiting service option; and determining that the subscriber line is on-hook and the caller has hung up.

6. The method as recited in claim 3, wherein the missed calls percentage and the modified missed calls percentage is an unattended missed calls percentage, and the custom service option is selected from voice mail and call forwarding.

7. The method as recited in claim 6, wherein the missed calls percentage and the modified missed calls percentage is a busy missed calls percentage, and the custom service option is selected from call waiting, transfer on busy, and the installation of an additional subscriber line.

* * * * *